United States Patent
Ta et al.

(10) Patent No.: US 8,565,284 B2
(45) Date of Patent: Oct. 22, 2013

(54) SPREAD SPECTRUM CLOCK GENERATOR AND METHOD

(75) Inventors: Paul D. Ta, Fremont, CA (US); Wei Wang, San Jose, CA (US); Alvin Wang, Saratoga, CA (US); Peter D. Bradshaw, Sunnyvale, CA (US)

(73) Assignee: Intersil Americas Inc., Milpitas, CA (US)

( * ) Notice: Subject to any disclaimer, the term of this patent is extended or adjusted under 35 U.S.C. 154(b) by 1133 days.

(21) Appl. No.: 11/838,084

(22) Filed: Aug. 13, 2007

(65) Prior Publication Data

US 2008/0037613 A1 Feb. 14, 2008

Related U.S. Application Data

(60) Provisional application No. 60/822,311, filed on Aug. 14, 2006.

(51) Int. Cl.
*H04B 1/00* (2006.01)

(52) U.S. Cl.
USPC ........... 375/130; 375/133; 375/141; 375/146; 375/147; 375/149; 375/269; 375/296; 375/327; 375/371; 375/376; 327/144; 327/156; 327/291; 327/298; 327/296

(58) Field of Classification Search
USPC ......... 375/130, 133, 141, 146–147, 149, 269, 375/396, 327, 371, 376; 327/291, 298, 144, 327/146, 191, 296
See application file for complete search history.

(56) References Cited

U.S. PATENT DOCUMENTS

| | | | | |
|---|---|---|---|---|
| 5,699,005 A * | 12/1997 | Menkhoff et al. | ............ | 327/292 |
| 5,970,110 A * | 10/1999 | Li | .................. | 377/48 |
| 6,144,242 A * | 11/2000 | Jeong et al. | .................. | 327/269 |
| 6,362,677 B1 * | 3/2002 | Petrofsky | ...................... | 327/348 |
| 6,518,813 B1 * | 2/2003 | Usui | ............ | 327/291 |
| 6,633,190 B1 * | 10/2003 | Alvandpour et al. | ......... | 327/291 |
| 6,737,904 B1 * | 5/2004 | Butaud et al. | ................ | 327/298 |
| 7,154,313 B2 * | 12/2006 | Lin et al. | ...................... | 327/164 |
| 7,209,061 B2 * | 4/2007 | Somayajula | ................ | 341/122 |
| 7,386,028 B2 * | 6/2008 | Egan et al. | .................. | 375/130 |
| 7,397,847 B2 * | 7/2008 | Ishida et al. | ................. | 375/226 |
| 7,425,275 B2 * | 9/2008 | Choi | ............... | 216/12 |
| 2002/0138780 A1 * | 9/2002 | Bock | ........................ | 713/500 |
| 2004/0076221 A1 * | 4/2004 | Refaeli et al. | ................ | 375/130 |

* cited by examiner

*Primary Examiner* — Sophia Vlahos
(74) *Attorney, Agent, or Firm* — Fogg & Powers LLC

(57) ABSTRACT

A spread spectrum clock signal generator and an accompanying method provide a spread spectrum clock signal of a reduced electromagnetic interference. The spread spectrum clock signal generator includes (a) a state machine, which maintains a current state of the spread spectrum clock signal generator, receives as input value a next state of the spread spectrum clock signal generator and generates a clock phase selection signal based on the current and next states; (b) a random number generator for generating the next state; and (c) a waveform generation circuit for generating a spread spectrum clock signal based on the clock phase selection signal.

21 Claims, 3 Drawing Sheets

FIG. 1 BLOCK DIAGRAM

PREVIOUS STATES OF RANDOM NUMBER GEN.

| PRESENT STATES | -3 | -2 | -1 | 0 | 1 | 2 | 3 |
|---|---|---|---|---|---|---|---|
| -3 | 30 | 29 | 28 | 27 | 26 | 25 | 24 |
| -2 | 31 | 30 | 29 | 28 | 27 | 26 | 25 |
| -1 | 32 | 31 | 30 | 29 | 28 | 27 | 26 |
| 0 | 33 | 32 | 31 | 30 | 29 | 28 | 27 |
| 1 | 34 | 33 | 32 | 31 | 30 | 29 | 28 |
| 2 | 35 | 34 | 33 | 32 | 31 | 30 | 29 |
| 3 | 36 | 35 | 34 | 33 | 32 | 31 | 30 |

SPREAD SPECTRUM CLOCK GENERATOR AND METHOD

REFERENCE TO RELATED APPLICATIONS

The present application is related to and claims priority to copending U.S. provisional patent application, entitled "Spread Spectrum Clock Generator and Method," Ser. No. 60/822,311, filed on Aug. 14, 2006. The disclosure of the copending provisional application is hereby incorporated by reference in its entirety.

BACKGROUND OF THE INVENTION

1. Field of the Invention

The present invention relates to high speed data communication (e.g., 1 G-bit/second or higher). In particular, the present invention relates to a signaling technique that reduces electromagnetic interference (EMI) associated with parallel data.

2. Discussion of the Related Art

Parallel data provided at a high data rate transitioning at a fixed frequency (i.e., at fixed regular data intervals) may generate electromagnetic noise with sufficient energy to interfere with operations in other electronic devices (e.g., wireless or cellular telephones). Such electromagnetic noise is characterized by having a large amount of energy concentrated at the frequencies of the data transitions. It is known that a spread spectrum technique can be applied to alleviate the interference by distributing the energy of the electromagnetic noise over a wider range of frequencies.

Significant EMI problems may arise in a deserializer application in which data in a serial data signal are converted to parallel data. Spread spectrum techniques may be applied to reduce EMI. However, to apply spread spectrum techniques to such an application requires an additional external spread spectrum crystal source, a complicated phase-locked loop (PLL) for the receiving the input serial signal and a digital spread spectrum clock generator to modulate the serial data. These additional components increase both the cost and design time for the deserializer circuit.

SUMMARY OF THE INVENTION

According to one embodiment of the present invention, a spread spectrum clock signal generator and an accompanying method provide a spread spectrum clock signal of a reduced electromagnetic interference. The spread spectrum clock signal generator includes (a) a state machine, which (i) maintains a current state of the spread spectrum clock signal generator, (ii) receives as input value a next state of the spread spectrum clock signal generator and (iii) generates a clock phase selection signal based on the current and next states; (b) a random number generator for generating the next state; and (c) a waveform generation circuit for generating the spread spectrum clock signal based on the clock phase selection signal.

In one embodiment of the present invention, a receiver including the spread spectrum signal generator receives a serial data signal to provide parallel data signals clocked at by the spread spectrum clock signal generated by the spread spectrum signal generator. In that embodiment, the spread spectrum clock signal has an average frequency that is a predetermined fraction of the clock signal that clocks the serial data signal. In one implementation, the clock signal for the serial data signal is embedded in the serial data signal and recovered in the receiver.

The present invention is better understood upon consideration of the detailed description below and the accompanying drawings.

DETAILED DESCRIPTION OF THE PREFERRED EMBODIMENTS

The present invention generates a spread spectrum clock signal to be used for modulating data transitions in parallel data lines, so as to reduce electromagnetic interference (EMI).

Figure 1:
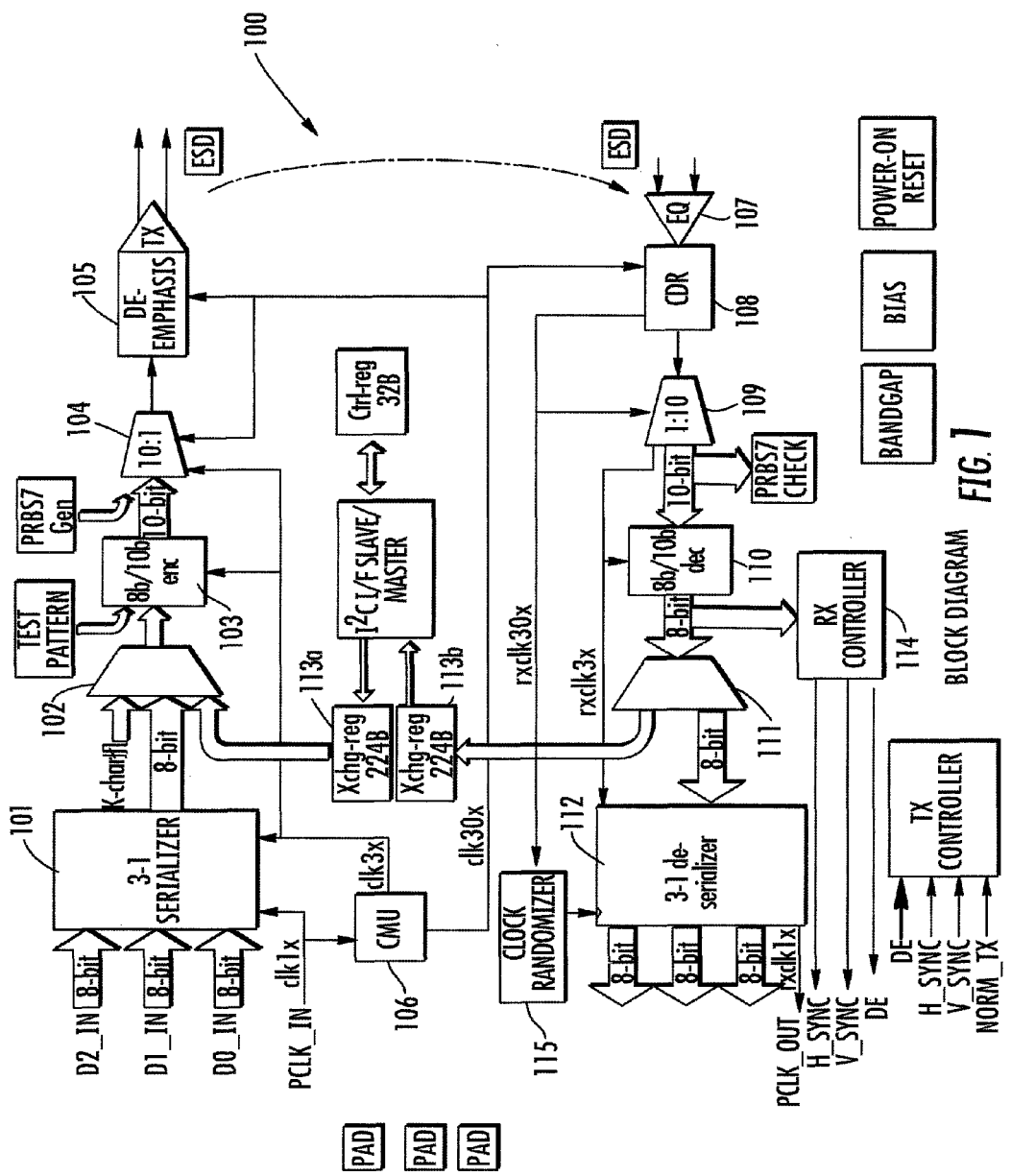
FIG. 1 shows serializer/deserializer circuit 100 which is an exemplary circuit suitable for implementing a spread spectrum clock generation circuit, according to one embodiment of the present invention.

One application of the present application may be the data transmission between a video decoder (e.g., a DVD player) and a video display system (e.g., an LCD monitor). FIG. 1 shows serializer/deserializer circuit 100 which is an exemplary circuit suitable for implementing the spread spectrum clock generator circuit, according to one embodiment of the present invention. In the application between the video decoder and the video display system, a copy of serializer/deserializer circuit 100 may be provided at each end. The serializer/deserializer circuits are then connected by a single serial cable.

As shown in FIG. 1, serializer/deserializer circuit 100 includes 3-1 serializer circuit 101, which serializes three 8-bit parallel data streams into a single 3× 8-bit parallel data stream at 3 times the data rate of the input data streams[1]. The three input data streams may be, for example, three video data streams for driving three or more graphical displays (e.g., LCD monitors). Multiplexer 102 may select, in addition to the 3× 8-bit data stream from 3-1 serializer circuit 101, one or more additional 8-bit data streams (e.g., video data control signals and a control data stream) for transmission. Video data control signals may include V_SYNC (vertical synchronization), H_SYNC (horizontal synchronization) and DE (display enable). The selected 8-bit data stream from multiplexer 102 is encoded in 8/10-bit encoder 103, using an 8/10 b coding scheme for serial data transmission known to those skilled in the art. 8-bit test data may be injected into the data stream at 8/10-bit encoder 103. The 10-bit encoded data is serialized in serializing circuit 104 for transmission by transmitter 105 into the communication channel (i.e., the serial cable). In this embodiment, as in many high speed communication schemes, the communication channel may use low voltage differential signaling (LVDS). Transmission circuit 105 may include a pre-emphasis circuit to shape the output waveform to compensate anticipated distortion in the communication channel. Management unit 106 provides the necessary 1×, 3× and 30× system clock signals.

[1] The 3-1 serialization combining three 10-bit data streams into a single serial data stream is provided herein merely as an example. Other serialization scheme (e.g., combining two serial 10-bit data streams into a single serial data stream) are possible and falls within the scope of the present invention.

Serializer/deserializer circuit 100 includes a receiver circuit for receiving data in the reverse direction from the communication channel. The receiver circuit includes equalizer 107, which further compensates for distortion in the communication channel. Clock recovery circuit 108 recovers the 30× system clock signal, which is then used to provide the 1×, 3× and 30× clock signals used in the receiver circuit. The received serial data stream is deserialized in deserializer 109 into a 10-bit data stream, which is decoded by 8/10 b decoder 110 according to the coding scheme back to an 8-bit data stream. From this decoded 8-bit data stream (at three times data rate), demultiplexer 111 recovers the 3× 8-bit data stream and the control data stream. The video data control signals are also recovered from the decoded 8-bit data stream by receiver controller 114. The individual input 8-bit data streams are recovered in 3-1 deserializer 112 from the 3× 8-bit data stream. Clock randomizer circuit 115 modulates the individual data signals and the 1× clock signal to reduce electromagnetic interference (EMI). The control data to be transmitted and the control data received are stored respectively in registers 113a and 113b respectively. The control data may originate from or directed to devices attached to an I²C interface bus.

In the above description, serializer/deserializer circuit 100 operates in a 24-to-1 mode (i.e., serializing three 8-bit data streams). Serializer/deserializer circuit 100 may also operate in a 16-to-1 data mode. Data may be grouped under either mode in units of "pixel". Under 24-to-1 mode, each pixel transmitted consists of three 10-bit bytes, and under 16-t0-1 mode, each pixel consists of two 10-bit bytes.

Figures 2, 3:
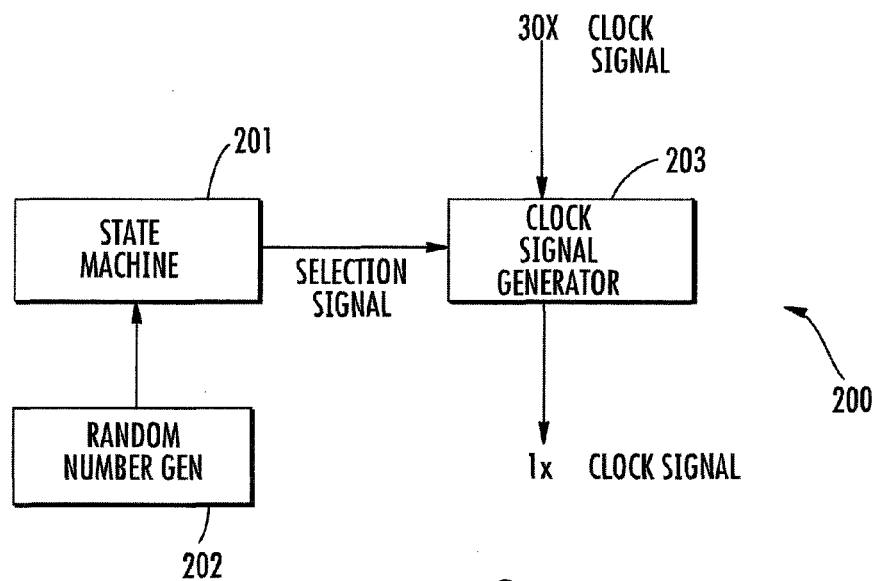
FIG. 2 shows spread spectrum clock generator circuit 200, in accordance with one embodiment of the present invention.
FIG. 3 shows a state transition table which indicates the duration, in number of 1× clock cycles, for the next state.

For this embodiment, the spread spectrum clock generator of the present invention may provide the 1× clock signal by dividing down the input clock clk_in (i.e., the 30× clock signal) to a clock signal having a frequency that varies between frequencies clk_in/27 and clk_in/33. The frequency variation may be provided, for example, in accordance with a Gaussian distribution that has a mean frequency of clk_in/30. To implement such a scheme, clock randomizer circuit 115 includes a spread spectrum clock generator, which may be implemented by clock generator circuit 200 of FIG. 2. As shown in FIG. 2, clock signal circuit 200 includes state machine 201, random number generator 202, and clock signal generator 203. Clock signal generator 203 generates the 1× clock signal by selecting one of seven clock phases to drive 3-1 deserializer 112. State machine 201 implements seven states: −3, −2, −1, 0, 1, 2 and 3. The state number represents the phase offset in clk_in periods ("t_clk_in's") between corresponding edges of the selected clock signal relative to the clk_in/30 signal. For example, if the previous state of the 1× clock signal is −2, the previous rising edge of the 1× clock signal is two_t_clk_in's earlier than the rising edge of the clk_in/30 clock signal; similarly, if the previous state of the 1× clock signal is 3, the rising or falling edge of the 1× clock signal is three t_clk_in's later than the corresponding edge in the clk_in/30 signal.)

FIG. 3 shows a state transition table which indicates the time in t_clk_in's between previous rising or falling edge and the present corresponding edge. For example, if the previous state is −3 and the present state is −1, there are 32 t_clk_in's between the previous rising edge and the present rising edge, so that the average frequency for the 1× clock is maintained at clk_in/30.

Figure 4:
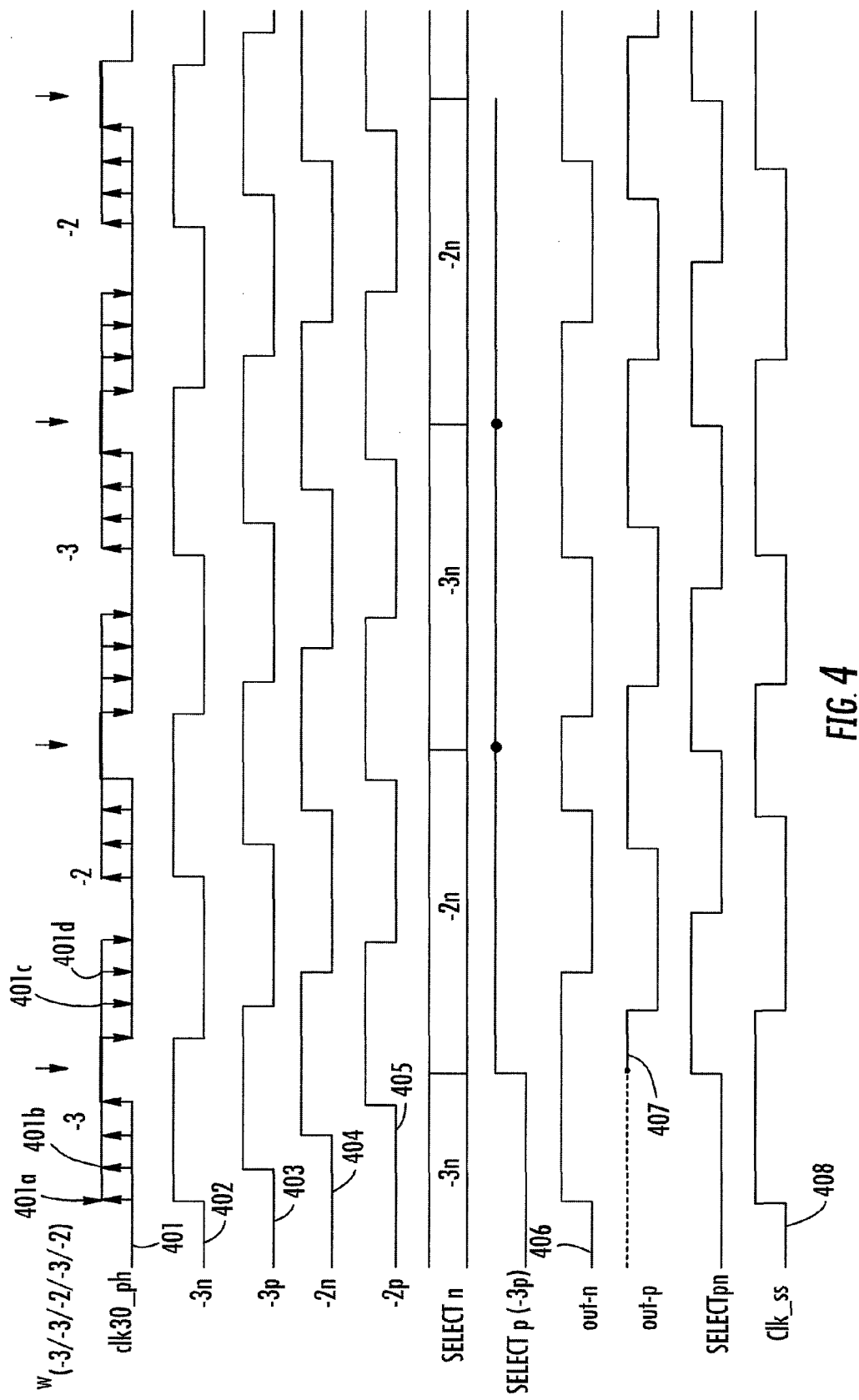
FIG. 4 shows selected clock waveforms in clock signal generator 203, in accordance with one embodiment of the present invention.

FIG. 4 shows selected clock waveforms in clock signal generator 203. As shown in FIG. 4, waveform 401 indicates the transition times for various clock phase offsets. For example, transition times 401a and 401b indicate the transition times for leading edges of clock phases −3 and −2 respectively. Similarly, transition times 401c and 401d indicating the trailing edges of clock phases −3 and −2, respectively. In this embodiment, differential signaling is used. Waveforms 402 and 403 are the waveforms at the terminals of the 1× clock signal for phase −3. Similarly, waveforms 404 and 405 are the waveforms at the terminals of 1× clock signal −2. FIG. 4 shows state machine entering states −3, −2, −3 and −2 in sequence. Waveforms 406 and 407 show the selection of the transition times at the terminals of the 1× clock signal according to this transition sequence. Waveform 408 represents the single-ended clock signal derived from differential waveforms 406 and 407.

The detailed description above is provided to illustrate the specific embodiments of the present invention and is not intended to be limiting. Numerous variations and modifications within the scope of the present invention are possible. The present invention is set forth in the following claims.

We claim:

1. A spread spectrum clock signal generator, comprising:
a state machine, which maintains a current state of the spread spectrum clock signal generator, receives as an input value a next state of the spread spectrum clock signal generator and generates a clock phase selection signal based on the current and next states, the clock phase selection signal selecting from a predetermined positive phase offset and a predetermined negative phase offset between at least one of a rising edge and trailing edge of a selected clock signal and a corresponding rising edge and trailing edge of a reference clock signal;
a random number generator that generates the next state; and
a waveform generation circuit that generates spread spectrum clock signal by receiving the clock phase selection signal including the selected predetermined positive phase offset or predetermined negative phase offset, dividing the reference clock signal, and generating the selected clock signal responsive to the predetermined positive phase offset or predetermined negative phase offset in the received clock phase selection signal.

2. A spread spectrum clock signal generator as in claim 1, wherein each state of the state machine associates a phase variation relative to the reference clock signal.

3. A spread spectrum clock signal generator as in claim 2, wherein a probability of selecting each state is based on the state's corresponding phase variation.

4. A spread spectrum clock signal generator as in claim 3, wherein the state machine operates such that the spread spectrum clock signal has an average frequency derived from a frequency of the reference clock signal.

5. A spread spectrum clock signal as in claim 4, wherein the average frequency is substantially a fraction of the frequency of the reference clock signal.

6. A spread spectrum clock signal generator as in claim 3, wherein a plurality of phase variations are distributed according to a predetermined probability distribution function.

7. A spread spectrum clock signal generator as in claim 6, wherein the predetermined probability is distributed according to a Gaussian distribution function.

8. A spread spectrum clock signal generator as in claim 2, wherein the waveform generation circuit generates the spread spectrum clock signal by dividing down the reference clock signal and applying the phase variation.

9. A method for generating a spread spectrum clock signal using a state machine, comprising:
based on a current state of the state machine, and an input value received, selecting a next state for the state machine using a random number generator;
according to the current state and the next state, generating a clock phase selection signal, the clock phase selection signal selecting from a predetermined positive phase offset and a predetermined negative phase offset between at least one of a rising edge and trailing edge of a selected clock signal and a corresponding rising edge and trailing edge of a reference clock signal; and generating the spread spectrum clock signal by receiving the clock phase selection signal including the selected predetermined positive phase offset or predetermined negative phase offset, dividing the reference clock signal, and generating the selected clock signal responsive to the predetermined positive phase offset or predetermined negative phase offset in the received clock phase selection signal.

10. A method as in claim 9, wherein each state of the state machine associates a phase variation relative to the reference clock signal.

11. A method as in claim 10, wherein a probability of selecting each state is based on the state's associated phase variation.

12. A method as in claim 11, wherein the state machine operates such that the spread spectrum clock signal has an average frequency derived from a frequency of the reference clock signal.

13. A method as in claim 12, wherein the average frequency is substantially a fraction of the frequency of the reference clock signal.

14. A method as in claim 11, wherein a plurality of phase variations are distributed according to a predetermined probability distribution function.

15. A method as in claim 14, wherein the predetermined probability is distributed according to a Gaussian distribution function.

16. A method as in claim 11, wherein generating the spread spectrum clock signal further comprises dividing down the reference clock signal and applying the phase variation.

17. A receiver for receiving a serial data signal, comprising:
a clock recovery circuit that extracts from the serial data signal an input clock signal of a predetermined frequency;
a clock signal generator receiving the input clock signal to provide a spread spectrum clock signal having an average frequency that is a predetermined fraction of the predetermined frequency of the input clock signal, the clock signal generator including:
a state machine that maintains a current state of the clock signal generator, receives as an input value a next state of the clock signal generator, and generates a clock phase selection signal based on the current and next states, the clock phase selection signal selecting from a predetermined positive phase offset and a predetermined negative phase offset between at least one of a rising edge and trailing edge of a selected clock signal and a corresponding rising edge and trailing edge of the input clock signal;
a random number generator that generates the next state;
a waveform generation circuit that generates the spread spectrum clock signal by receiving the clock phase selection signal including the selected predetermined positive phase offset or predetermined negative phase offset, dividing the input clock signal, and generating the selected clock signal responsive to the predetermined positive phase offset or predetermined negative phase offset in the received clock phase selection signal; and
a deserializer that converts the serial data signal into output data signals in a parallel format, the output data signals having timing based on the selected clock signal.

18. A receiver as in claim 17, wherein each state of the state machine associates a phase variation relative to the input clock signal.

19. A receiver as in claim 18, wherein the probability of selecting each state is based on the state's corresponding phase variation.

20. A receiver as in claim 18, wherein a plurality of phase variations are distributed according to a Gaussian distribution function.

21. A receiver as in claim 18, wherein the waveform generation circuit generates the spread spectrum clock signal by dividing down the input clock signal and applying the phase variation.

* * * * *